July 9, 1963
C. LENZ
3,096,795
ARTICLE-TRANSFER DEVICE
Filed Jan. 13, 1960
5 Sheets-Sheet 1
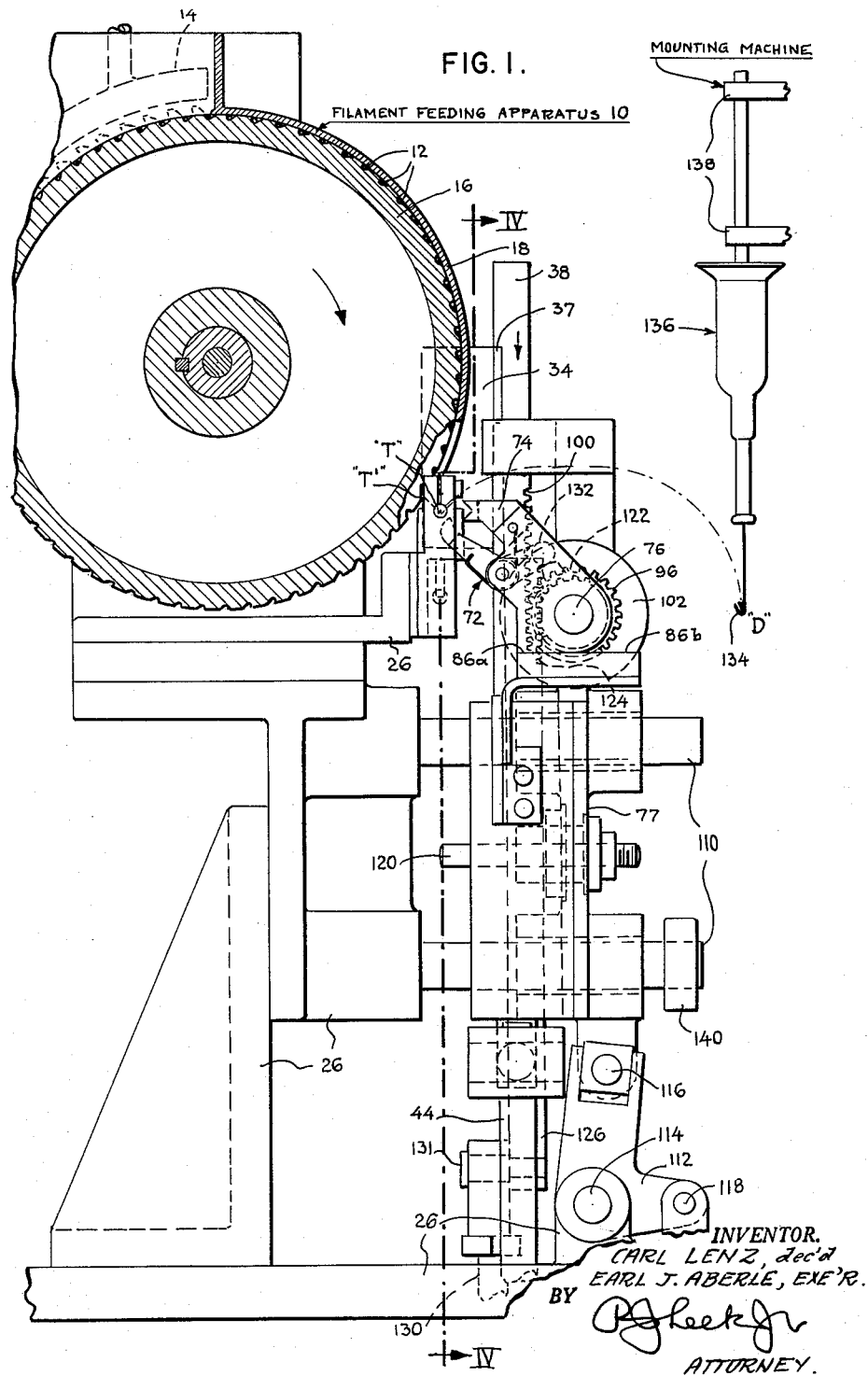
INVENTOR.
CARL LENZ, dec'd
EARL J. ABERLE, EXE'R.
BY
ATTORNEY.

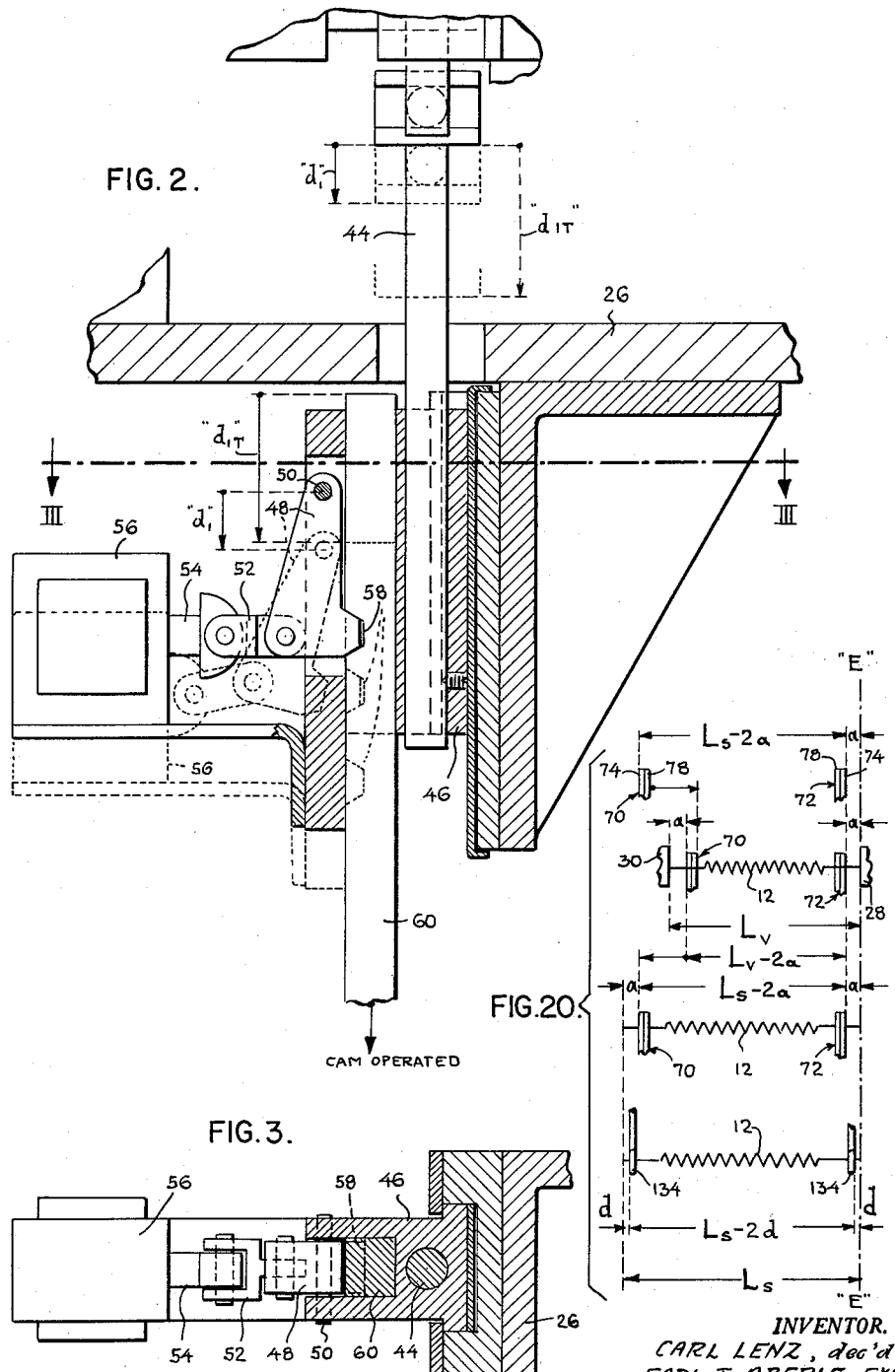

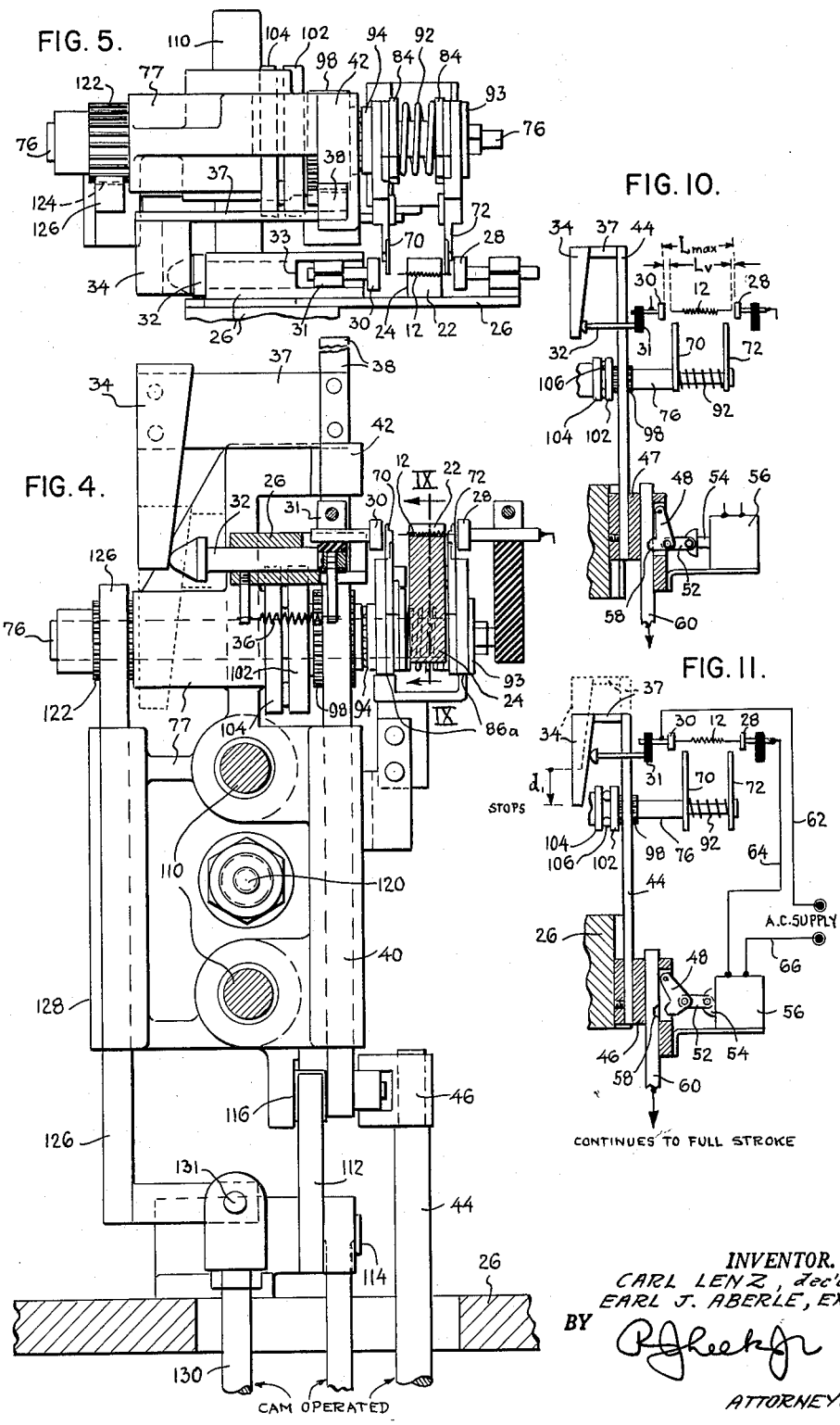

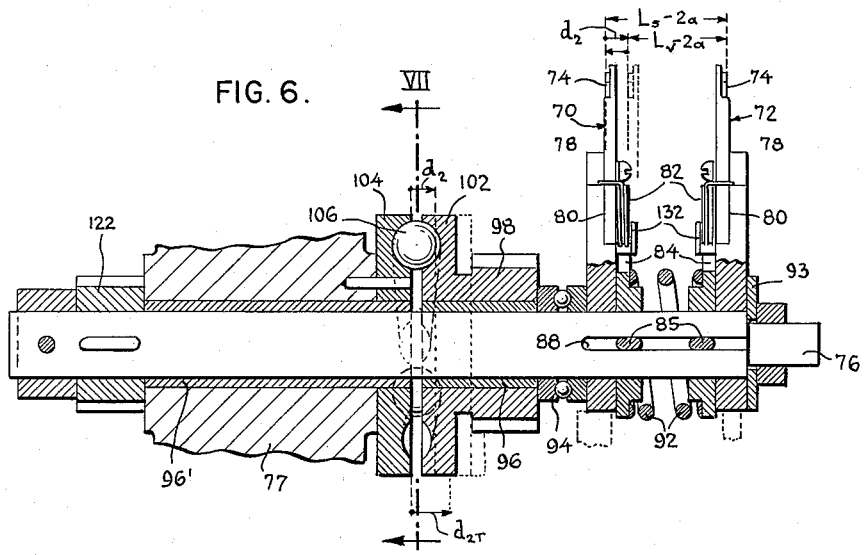
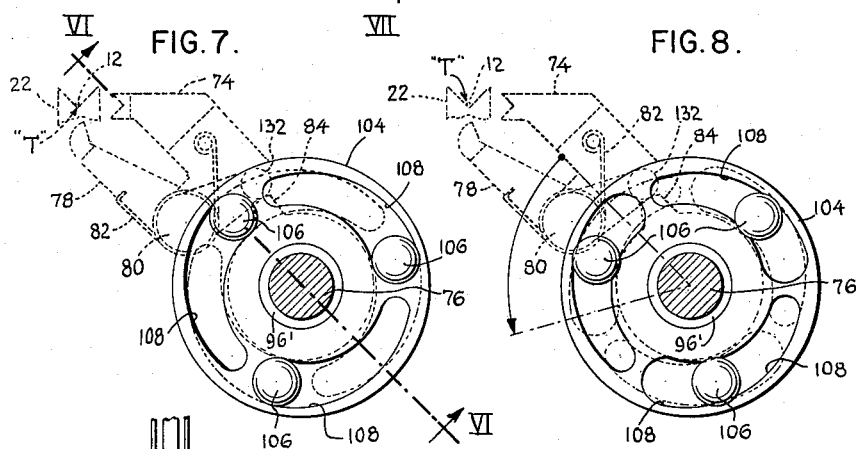
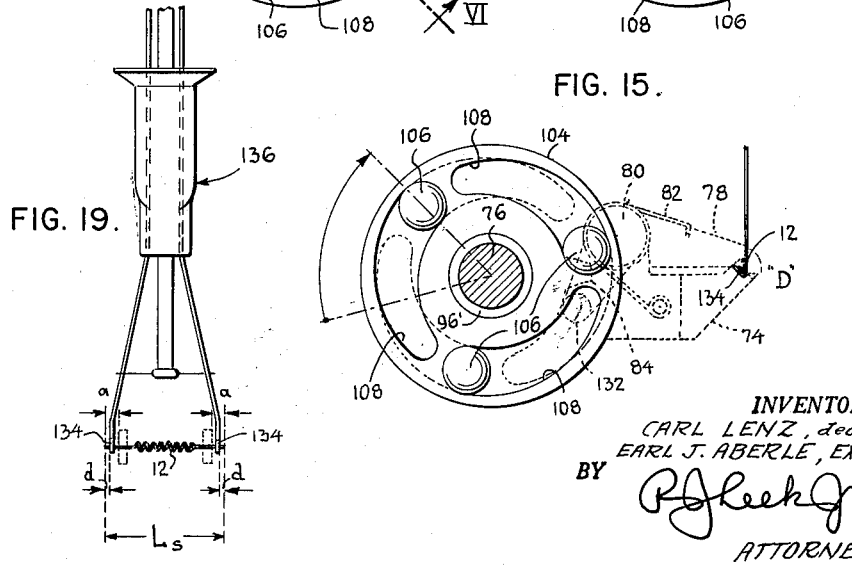
INVENTOR.
CARL LENZ, dec'd
EARL J. ABERLE, EXE'R.
BY
ATTORNEY.

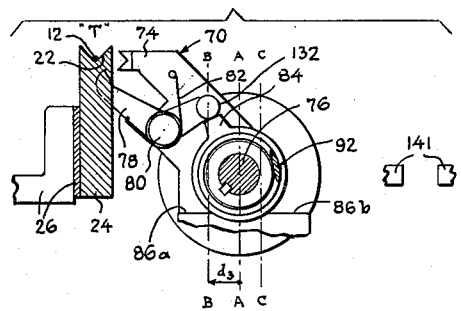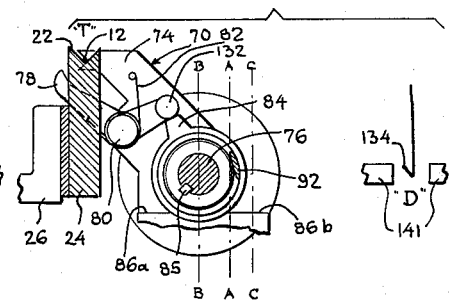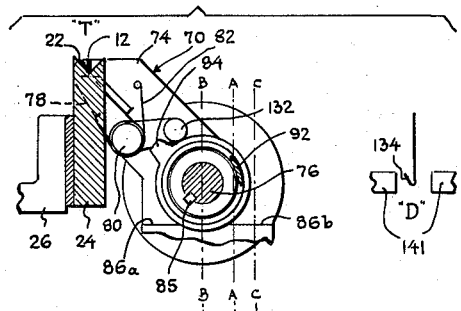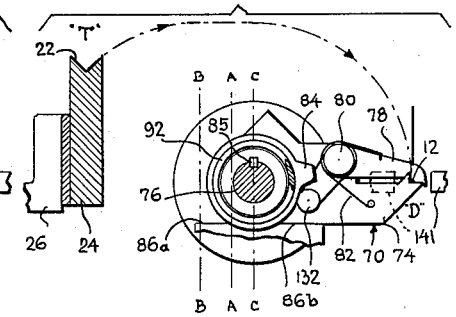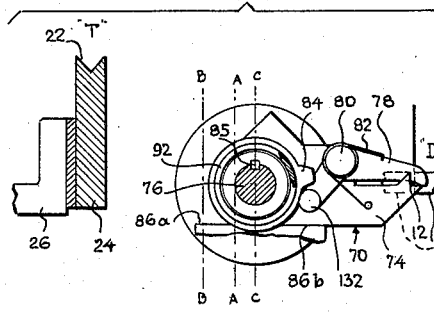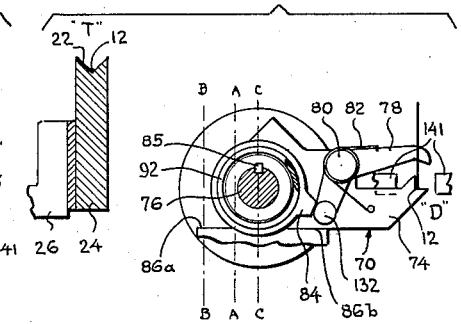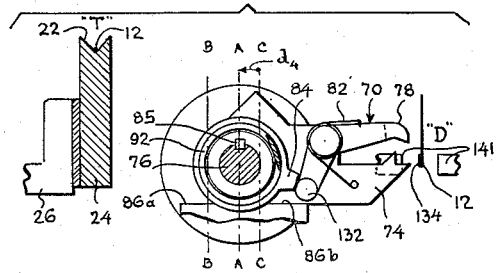

United States Patent Office 3,096,795
Patented July 9, 1963

3,096,795
ARTICLE-TRANSFER DEVICE
Carl Lenz, deceased, late of Wayne, N.J., by Earl J. Aberle, executor, Wayne, N.J., assignor to Westinghouse Electric Corporation, East Pittsburgh, Pa., a corporation of Pennsylvania
Filed Jan. 13, 1960, Ser. No. 2,191
1 Claim. (Cl. 140—71.6)

The present invention relates to apparatus for transferring elongated articles and for stretching such elongated articles during transfer to a predetermined length and, more particularly, to apparatus for transferring filaments for electrical devices, such as incandescent lamps and the like, from a filament-feeding device to a filament-mounting machine and for stretching such filaments during transfer to a predetermined length.

In the manufacture of incandescent lamps, a coiled-coil filament (produced by winding a primary coil around a second mandrel) is most commonly utilized because such coiled-coil filament is easier to mount with automatic filament-mounting machines than the primary coil. During the second coiling of the primary coil to produce the coiled-coil filament, the mandrel from the primary coil is left in place to prevent distortion of the primary coil during such coiling. When this mandrel is acid-dissolved out of the coiled-coil filament, the stresses induced in the coiled-coil filament during its coiling causes springback in such coiled-coil filament so that these filaments vary about 4.0 mm. in length and hence in the number of turns per inch, even though each such coiled-coil filament contains the same total uncoiled length of tungsten wire.

Following fabrication of the coiled-coil filament the legs thereof are then mounted in the hooks provided in the lead wires of the stem, the hooks are closed on the filament legs, and the mounted filament is thereafter stretched to a fixed lighted-filament length (i.e. length of filament between the lead wires) to provide the specified turns per inch in the mounted filament.

The turns per inch in the mounted filament is critical and influences the inital efficiency of the lamp as measured in lumens per watt and the life of the finished incandescent lamp as measured in hours. Specifically, a one turn per inch variation from the specified number of turns per inch in the mounted coiled-coil filament of a 100 watt size filament for example, produces a 1% change in the initial efficiency and results in a 7% change in life.

A further critical characteristic of such a 100 watt lamp filament is the uncoiled length of tungsten wire required to make up the lighted-filament length (i.e. the portion of the coiled-coil filament disposed between the lead wires). All such filaments are fabricated from the same total uncoiled length of tungsten wire, which total uncoiled length includes the uncoiled length in the portion between the lead wires and in the portions projecting beyond. Since a 1% change in such uncoiled length of tungsten wire required to make up the lighted filament length produces a 14% change in lamp life, the filament legs must be clamped in the lead wires very accurately so that the legs project an equal distance beyond the hooks on each side of the stem.

Heretofore, coiled-coil filaments which are to be vertically mounted parallel to the mount axis have been oriented and transferred to the filament-mounting machine satisfactorily by automatic apparatus of the type shown in copending application, Serial No. 787,165, filed January 16, 1959, now Patent No. 3,039,497, by T. Hamilton et al. and assigned to the same assignee as the present invention.

The transfer device of the present invention is an improvement on this filament-transferring and orienting apparatus. For example, it has been found in practice that the control means utilized with the filament-transferring and orienting apparatus, as shown in such copending application, is complicated and expensive. In addition, the spacing between the filament-leg gripping jaws (on the filament-supporting heads carried by the orienting turret of such filament-transferring and orienting apparatus) must be adjusted by the control means thus resulting in a more complicated filament-supporting head.

In the case of conventional apparatus for horizontally mounting filaments transverse to the mount axis, the orienting turret is not employed and the lead-wire positioning jaws on the conventional apparatus are adjusted by the control means, with the result that a complicated stem-supporting head is required.

It is the general object of the present invention to avoid and overcome the foregoing and other difficulties of and objections to prior art practices by the provision of an improved transfer device for apparatus for transferring and stretching elongated articles.

Still another object of the present invention is the provision of an improved transfer device for the filament-transferring and orienting apparatus, which permits the use of a simplified and inexpensive control means thus reducing the number of moving parts, requiring less maintenance and resulting in more efficient operation.

Yet another object of the present invention is the provision of an improved transfer device for a filament-transferring and orienting apparatus, which permits the use of a simplified filament-supporting head on the orienting turret utilized to orient the filament and to present such filament to the filament-mounting machine.

A further object of the present invention is the provision of an improved transfer device for a filament-transferring and orienting apparatus which permits the use of a simplified stem-supporting head on the filament-mounting machine for mounting horizontal filaments.

A still further object of the present invention is the provision of an improved transfer device which assures the positive simultaneous operation of both the measuring head for the varied-length filaments and a jaw-positioning mechanism of the transfer device.

The aforesaid objects of the present invention, and other objects which will become apparent as the description proceeds, are achieved by providing a measuring head for determining the length of an elongted article, an article-transfer device having a pair of article-gripping jaws operable to receive such elongated article and a jaw-positioning mechanism controlled by the measuring head to position the article-gripping jaws for receiving the measured elongated article with portions of such measured elongated article projecting an equal distance beyond such article-gripping jaws, the improved transfer device being operable thereafter to transfer the measured elongated article to an article-fabricating machine and to stretch the secured elongated article during transfer to a predetermined length.

For a better understanding of the present invention reference should be had to the accompanying drawings, wherein like numerals of reference indicate similar parts throughout the several views and wherein:

FIG. 1 is a side-elevational view of a portion of the filament-feeding apparatus (partially in vertical section), the filament-transfer apparatus of the present invention and a portion of a head disposed at the filament-mounting station of a filament-mounting machine for mounting a horizontally disposed filament on a lamp stem, and showing the filament-transfer apparatus in the starting position.

FIG. 2 is a view similar to FIG. 1, constituting a longitudinal continuation of such FIG. 1, and showing an operating mechanism for arresting the positioning movement of a movable head of the filament-transfer apparatus when the movable head has been properly positioned with respect to a stationary head preparatory for reception of a measured filament in such heads.

FIG. 3 is a horizontal-sectional view of the operating mechanism taken along the line III—III of FIG. 2 in the direction of the arrows.

FIG. 4 is a vertical-sectional view of the filament-transfer apparatus taken along the line IV—IV of FIG. 1 in the direction of the arrows.

FIG. 5 is a plan view of the filament-transfer apparatus shown in FIG. 4.

FIG. 6 is a vertical-sectional view taken along the line VI—VI of FIG. 7 in the direction of the arrows and showing the details of the upper portions of the filament-transfer apparatus.

FIG. 7 is a vertical-sectional view of the cam mechanism for spacing the movable head from the stationary head, taken along the line VII—VII of FIG. 6 in the direction of the arrows.

FIG. 8 is a view similar to FIG. 7 showing the position of the cam mechanism at the end of a typical filament-measuring operation.

FIG. 9 is a vertical-sectional view taken along the line IX—IX of FIG. 4 in the direction of the arrows and showing the position of the movable head during the filament-measuring operation, the position of the movable head representing also the identical position of the stationary head (not shown).

FIG. 10 is a fragmentary plan view of the filament-measuring head and the movable head and stationary head of the filament-transfer apparatus of the start of the filament-measuring operation.

FIG. 11 is a view similar to FIG. 10 and showing the position of the associated heads at the end of the filament-measuring operation.

FIG. 12 is a view similar to FIG. 9 illustrating the lateral movement of the movable head into engagement with one leg of the now measured filament and representing the similar movement of the fixed head (not shown).

FIG. 13 is a view similar to FIGS. 9 and 12 and showing the securement of one leg of the measured filament between the movable filament-leg gripping jaw and stationary filament-leg gripping jaw on the movable head.

FIG. 14 is a view similar to FIGS. 9, 12 and 13, showing the simultaneous lateral movement and rotating movement of the movable head and the filament secured therein to remove the secured filament from the measuring head and to position the legs of the gripped filament in the open hooks of a lamp stem.

FIG. 15 is a view similar to FIGS. 7 and 8 illustrating the retracting movement of the cam mechanism to stretch the gripped filament to a predetermined length during the transfer of such gripped filament from the measuring head to the open hooks in the lamp stem.

FIG. 16 is a view similar to FIGS. 9 and 12 through 14, illustrating the closing of the hooks of the lamp stem about the filament legs by the clamping jaws.

FIG. 17 is a view similar to FIGS. 9, 12 through 14 and 16, showing the opening of the movable filament-leg gripping jaws and the clamping jaws preparatory for lateral retraction of the movable head and stationary head (not shown).

FIG. 18 is a view similar to FIGS. 9, 12 through 14, 16 and 17, illustrating the lateral retraction of the movable head to permit the indexing of the lamp mount out of the filament-mounting station of the filament-mounting machine.

FIG. 19 is a side-elevational view of a finished lamp mount as it indexes out of the filament-mounting station of the filament-mounting machine.

FIG. 20 is a diagrammatic plan view illustrating successive positions of the filament-leg gripping jaws, filament-measuring contacts and hooks in the operating cycle of the filament-transfer apparatus of the present invention.

Although the principles of the present invention are broadly applicable to the transfer of elongated articles and to the stretching of such elongated articles during transfer to a predetermined length, the apparatus of the present invention is particularly adapted for transferring filaments to a filament-mounting machine for incandescent lamps having a horizontally mounted filament and for stretching such filaments during transfer to a predetermined length and hence it has been so illustrated and will be so described.

With specific reference to the form of the present invention illustrated in the drawings and referring particularly to FIG. 1, a filament-feeding apparatus (of the type shown in U.S. patent application, Serial No. 629,754, filed December 20, 1956, now Patent No. 2,908,420, by T. A. Hoffmann et al. and assigned to the same assignee as the subject application) is indicated generally by the reference numeral 10.

Variable length coiled-coil filaments 12 are vibrated under an arcuate transfer shoe 14 of such filament-feeding apparatus 10 and onto an indexable transfer wheel 16 which transports a filament 12 in step-by-step movement to Station "T'" located at the end of the peripheral filament-retaining plate 18. At Station "T'" such filament 12 gravitates downwardly into a V-shaped filament-centralizing notch 22 (FIGS. 4, 9, 12 and 13) provided in a filament-supporting block 24, preparatory for a filament-measuring operation. This filament supporting block 24 is mounted in frame portions 26 (FIG. 4) of the filament-feeding apparatus 10, and of the filament-transfer apparatus of the present invention, to dispose the filament 12 in the filament-centralizing notch 22 in registry with a control means or filament-measuring head at the filament pick-up position "T." This filament-measuring head measures the length "$L_v$" (FIGS. 10 and 20) of each variable length filament 12 at the filament pick-up position "T."

*Filament-Measuring Head*

Such filament-measuring head has a stationary contact 28 (FIGS. 4, 10, 11 and 20) which is mounted on, and electrically insulated from, the frame portions 26 (on line "E—E," FIG. 20) on one side of the filament-centralizing notch 22 and in registry with one leg of the filament 12, the length "$L_v$" of which is to be measured. To provide a cooperating measuring means for the stationary contact 28, a movable contact 30 is insulatedly mounted on an arm 31 (FIGS. 4 and 5) upstanding from an operating plunger 32 which is horizontally reciprocable in the frame portions 26. In order to maintain the movable contact 30 in registry with the stationary contact 28 during movement of the former, the arm 31 reciprocates in a slot 33 (FIG. 5) in the frame portions 26. At the start of the filament-measuring operation the movable contact 30 is disposed from the stationary contact 28 a distance $L_{max}$ (FIG. 10) which is greater than the maximum stretched length of the filament 12 being measured.

The drive means utilized to move the movable contact 30 from the starting position (FIG. 10) into engagement with the left-hand leg of the filament 12 in the filament-centralizing notch 22 and thereafter to push the filament 12 to the right to cause the right-hand leg to engage the stationary contact 28 (FIG. 11), comprises a vertically reciprocable cam 34 (FIGS. 4 and 5), engageable by the operating plunger 32 which is biased by a spring 36 (FIG. 4). This operating cam 34 is mounted by means of a bracket 37 on a slide 38 which is vertically reciprocable in guides 40 and 42 (FIG. 4) by a connecting rod 44 (FIGS. 2 and 4), which rod 44 carries a slides block 46. A dog 48 (FIG. 2) pivoted on the slide block 46 at 50 is connected by a link 52 to an armature 54 of a solenoid 56, which solenoid 56

(when deenergized) holds the dog 48 in engagement with a notch 58 on a cam-operated drive slide 60, thus coupling the drive slide 60 to the slide block 46 and ultimately (through the above-described linkage) causing reciprocating movement of the operating cam 34 and attendant operation of the movable contact 30.

As the movable contact 30 is moved to the right, as viewed in FIGS. 4, 5, 10, 11 and 20, from the starting position shown in FIGS. 4 and 10 it engages the left-hand leg of the filament 12 (having a length "$L_v$") and moves the filament 12 in the notch 22 until the right-hand leg of such filament 12 engages the stationary contact 28 (FIG. 11) whereupon an "operating" circuit is energized, as hereinafter described, and further movement of the movable contact 30 and the filament 12 pushed thereby ceases. In the position shown in FIG. 11, the now measured filament 12 is centralized with respect to the filament-transfer apparatus of the present invention and is positioned in its filament pick-up position "T" (FIGS. 12–14). Upon energization of the "operating" circuit the movable contact 30 will have moved horizontally a distance "$L_{max}.-L_v$" (FIGS. 10 and 11) and the slide rod 44, drive slide 60 and associated connected members, will also have moved a vertical distance "$d_1$" (FIG. 2).

Operating Circuit

The now closed "operating" circuit (FIG. 11) comprises a conductor 62 connected one side of a suitable voltage supply (indicated by the legend "A.C. Supply") to the movable contact 30; the filament 12; the stationary contact 28; a line 64 from the stationary contact 28 to one side of a coil (not shown) of the solenoid 56; and a conductor 66 joining the other side of such coil to the other side of the "A.C. Supply."

The aforementioned closure of the "operating" circuit energizes the coil of the solenoid 56 with attendant retraction of the armature 54 (to the left, as viewed in FIGS. 2 and 5, and to the right, as viewed in FIG. 11) and causes the resultant uncoupling of the slide block 46 from the drive slide 60 by removal of the dog 48 from the notch 58. Thereafter as the drive slide 60 moves downwardly to complete its downward stroke (a total distance of "$d_{1T}$," FIG. 2), the movable contact 30 and its associated linkage remains stationary.

Simultaneously with the above-described operation of the measuring head, a movable head 70 (FIGS. 5 and 6) of the filament-transfer apparatus has been positioned with respect to a stationary head 72 thereof to receive the measured centralized filament 12 with portions of the legs thereof projecting from the heads 70 and 72 an equal distance "$a$" (FIG. 20). The heads 70 and 72 form filament-transfer means operable to secure the filament 12 at predetermined locations (a distance "$a$" from the end of each leg) on such filament while the filament 12 is at the filament pick-up position "T" and to then transfer the secured filament to the filament discharge position "D" (FIGS. 1 and 14).

Although both the movable head 70 and the stationary head 72 are rotatable together from filament pick-up position "T" (FIG. 13) to filament-discharge position "D" (FIG. 14), as hereinafter related, the term movable is applied to the head 70 to distinguish it from the head 72 since the head 70 is movable laterally with respect to the stationary head 72.

Heads

The movable head 70 (FIGS. 1, 4–6, and 9–18) and stationary head 72 are essentially identical. Each head 70 and 72 comprises a fixed filament-leg gripping jaw 74 rotatably mounted on a shaft 76 (FIG. 6) journalled in a carriage 77 which is horizontally reciprocable with respect to frame portions 26, as hereinafter related. To provide cooperating filament-leg gripping means, a lever-like movable filament-leg gripping jaw 78 is pivoted at 80 on each fixed filament-leg gripping jaw 74 and is biased by a spring 82 (FIGS. 9, 12–14, and 16–18) into the normally-closed position shown in FIGS. 13, 14 and 16. However, at the start of the filament-transfer operation (FIGS. 1, 4 and 9) the movable jaws 78 are open due to previous operation of jaw-operating cams 84. These cams 84 are affixed to shaft 76 by keys 85 in a longitudinal keyway 88 in such shaft 76. The key 85 in the left-hand jaw-operating cam 84, as viewed in FIG. 6, permits such cam 84 to reciprocate horizontally with the movable head 70 on the shaft 76. So that the rotatable heads 70 and 72 will rotate with the shaft 76 unless such heads engage a stop means, such as a first stop 86a (FIG. 1), the jaw-operating cams 84 and the heads 70 and 72 are normally biased toward the starting position (FIG. 4) by a spring 92 surrounding the shaft 76 at which time such heads are a distance "$L_s-2a$" (FIG. 20) apart. This spring 92 frictionally wedges the stationary head 72 between its associated cam 84 and a plate 93 on the right-hand end of the shaft 76 (FIG. 6) and similarly wedges the movable head 70 between its associated cam 84 and a ball-bearing assembly 94 (FIG. 6). This assembly 94 rests against an integral gear 98 and movable race 102 mounted on a bushing 96 freely rotatable and reciprocable on the shaft 76. To prevent lateral movement of the shaft 76 (to the right under the biasing of the spring 92) with respect to the carriage 77, a stationary race 104 (separated by balls 106 from the movable race 102) is secured to the carriage 77, and a gear 122 is affixed to the shaft 76 in abutting engagement with carriage 77. The bushing 96 permits rotation of the shaft 76 with respect to the carriage 77 and the stationary race 104.

The gear 98, races 102 and 104 and balls 106 form a part of a cam mechanism associated with a positioning means comprising a jaw-positioning mechanism operable by the control means of the filament-measuring head to adjust the filament-transfer means or heads 70 or 72 to enable the latter to secure the filament at the predetermined locations, namely a distance "$a$" (FIG. 20) from the end of each leg.

As noted from FIG. 20 the fixed jaw 74 and movable jaw 78 of the stationary head 72 are located a distance "$a$" from the contact face of the stationary contact 28, positioned on the reference line "E—E."

Jaw-Positioning Mechanism

To first cause the simultaneous operation (and then simultaneous cessation of operation) of the filament-measuring head and the jaw-positioning mechanism, the gear 98 (FIGS. 4 and 6) is engageable with a rack segment 100 on the slide 38 (FIG. 1) which drives the filament-measuring-head, thus permitting the slide 38 to drive both the filament-measuring head and the jaw-positioning mechanism.

The stationary race 104 (FIG. 6) pinned to the carriage 77 cooperates with the movable race 102 (under urging of the spring 92) to contain the balls 106 in individual equi-spaced annular grooves 108 in such races 102 and 104. As shown in FIGS. 7, 8 and 15 the grooves 108, of semi-circular cross-section, shown in solid-lines in stationary race 104, decrease in radius or width in counterclockwise direction while the grooves 108 in the movable race 102 (and shown in dotted-lines) decrease in radius or width in clockwise direction.

When the slide 38 moves downwardly, as viewed in FIG. 1, resultant counterclockwise rotation of the gear 98 causes the grooves 106 in the movable race 102 to move from the dotted-line position shown in FIG. 7 (toward the shallow end of the grooves 108 in the stationary race 104) to the dotted-line position shown in FIG. 8, thus moving the balls 106 from the position shown in FIG. 7 to the position shown in FIG. 8. As a result the balls 106 forces the movable race 102 away from the stationary race 104 and move the movable race 104, gear 98, ball-bearing assembly 94 and movable head 70 a distance "$d_2$" (FIG. 6) to the right toward stationary head 72, thus positioning the fixed jaw 74 and movable jaw 78 on the movable head 70 a distance "$L_v-2a$" (FIG. 20) from the cooperating jaws 74 and 78 on the stationary head 72. Such spacing of the jaws 74 and 78 is accomplished when the "operating" circuit is closed (as hereinbefore related) by operation of the filament-measuring head. As shown in FIG. 6, the total possible movement of the movable head 70 toward the stationary head 72 is indicated by the distance "$d_{2T}$." At this point in the operational cycle the filament-measuring head and the jaw-positioning mechanism cease their lateral movement and are in the position shown in FIG. 11.

The movable head 70 and stationary head 72 (with the movable jaws 78 in the "open" position, FIG. 9) are then moved by a carriage-reciprocating mechanism from the position shown in FIG. 9 (with the center of the shaft 76 on the line "A—A") a distance "$d_3$" to position the shaft 76 on the line "B—B," as shown in FIG. 12, where the fixed jaw 74 then engages the legs of the measured centralized filament 12.

Carriage-Reciprocating Mechanism

As shown in FIGS. 1 and 4, the carriage 77 is mounted for horizontal reciprocating motion on guide rods 110 affixed to the frame portions 26. The means utilized to cause horizontal or lateral reciprocating movement of the carriage 77 on the guide rods 110 comprises a bell-crank lever 112, which can be termed a lateral movement means pivoted on the frame portions 26 at 114 and connected to the carriage 77 at 116 and to conventional cam-driven spring-biased linkage (not shown) at 118. To limit the movement of the carriage 77 to the aforesaid distance "$d_3$," to the left from the position shown in FIG. 9 to the position shown in FIG. 12, such carriage 77 carries an adjustable stop 120 (FIGS. 1 and 4) which is engageable with the frame portions 26 at the end of the horizontal movement of such carriage 77 to the left.

It will be understood from a consideration of FIGS. 9, 12–14 and 16–18 that although only the movable head 70 is therein shown, the various positions of such movable head 70 in these above-mentioned figures represent also the identical position of stationary head 72 which is not shown therein.

After the movable head 70 and stationary head 72 have been moved by the reciprocating mechanism, to the position shown in FIG. 12, the movable jaws 78 are caused to close about the legs of the measured centralized filament 12, as shown in FIG. 13 by operation of a head-oscillating mechanism, thus securing such legs of the measured centralized filament 12 therein with an equal overhang "$a$" (FIG. 20) projecting from each pair of jaws 74 and 78.

Head-Oscillating and Jaw-Closing Mechanism

The head-oscillating mechanism comprises the hereinbefore mentioned gear 122 (FIGS. 1, 4 and 6) affixed to the shaft 76 and rotatable by a rack 124 (FIG. 1) mounted on a slide 126. This slide 126 is reciprocable by a conventional cam-operated linkage in a suitable guide 128 provided in the frame portions 26, the connecting rod portion 130 of which cam-operated linkage is shown connected to the slide 126 at 131 (FIG. 4). It will be appreciated that since the jaw-operating cams 84 are keyed to the shaft 76, downward movement of the slide 126 (FIGS. 1 and 4) by this cam-operated linkage. as viewed in FIG. 4, causes the rack 124 to rotate the shaft 76 and the jaw-operating cams 84 in counterclockwise direction, when viewed in FIG. 12. Such rotation causes the raised portions of such cams 84 to engage rollers 132 on the movable jaws 78 and thus maintain such movable jaws 78 in their "open" position against the tension of spring 82. When the rollers 132 ride off the raised portions of the cams 84, as shown in FIG. 13, this again allows the spring 82 to cause closure of the movable jaws 78 on the legs of the measured centralized filament 12.

Thereafter the filament 12 (secured in the movable head 70 and stationary head 72) is transferred by pivotal movement from the filament pick-up position "T" on the filament-supporting block 24, shown in FIG. 13, to the filament-discharge position "D" shown in FIGS. 1 and 14, where the legs of such filament 12 are deposited in "open" hooks 134 provided in lead wires of a lamp mount 136 secured in a head 138 disposed at a filament-mounting station of a filament-mounting machine. It will be understood that since the head 138 is not associated with the filament-measuring head and does not have any moving parts which are positioned by the jaw-positioning mechanism, the construction of such head 138 is simplified with resultant reduced maintenance thereof. This physical transfer of the secured filament 12 from the filament pick-up position "T" on the filament-supporting block 24 to the filament-discharge position "D" in the "open" hooks 134 is accomplished by clockwise rotation of the heads 70 and 72 and the filament 12 (FIGS. 13 and 14) by the head-oscillating mechanism and the simultaneous lateral movement of the carriage 77. Hence the secured filament 12 is moved by the carriage-reciprocating mechanism to the right from the position shown in FIG. 13, a distance "$d_3+d_4$," so that the axis of the shaft 76 then lies on the line "C—C." This movement of the carriage 77 to the right to the position shown in FIG. 14 is limited by the stop 140 (FIG. 1) on the lower guide rod 110. Upward movement of the slide 126 and the rack 124 carried thereby (FIGS. 1 and 5), by the cam-operated linkage (not shown), causes the above-noted clockwise rotation of the shaft 76 together with the heads 70 and 72 and the filament 12 secured therein. Further clockwise rotation of the movable head 70 and stationary head 72 is prevented when such heads engage a second stop 86b (FIGS. 1 and 14).

It will be appreciated from a consideration of FIGS. 11 and 13 that when the heads 70 and 72 remove the filament 12 from the filament-centralizing notch 22 on the filament-supporting block 24, the "operating" circuit is broken with attendant deenergization of the solenoid 56. As a result the dog 48 is released and permitted to move to the left (FIG. 11) into engagement with the drive slide 60 which at this point in the operational cycle is at the bottom of its full downward stroke. During the upward stroke of the drive slide 60, which occurs during the filament-transfer operation, the dog 48, biased by a spring normally associated with the solenoid armature 54, will eventually engage the notch 58 in such drive slide 60 to again cause operation of the jaw-positioning mechanism.

During this above-described physical transfer operation the jaw-positioning mechanism causes the movable head 70 to move the jaw-positioning mechanism causes the movable head 70 to move to the left (FIG. 6) away from the stationary head 72 and its dotted-line position to the solid-line position shown in FIG. 6 thereby stretching the intermediate portions of the secured filament 12 from a length "$L_v-2a$" (FIG. 20) to a final predetermined length "$L_s-2a$." To accomplish this stretching operation the balls 106 are moved clockwise in the grooves 108 from the dotted-line position shown in FIGS. 8 and 15 to the solid-line position shown in FIG. 15 by clockwise rotation of the gear 98 (FIG. 6) and the movable race 102 caused by upward movement of the slide 38 (FIG. 4). When the stretched filament 12 is deposited into the hooks 134 (FIG. 20) the legs of such stretched filament 12 project from the open hooks 134 (which have been previously positioned by conventional means, not shown) an equal distance "$d$" (FIG. 20) from each open hook 134.

Thereafter, conventional clamping jaws 141 (FIGS. 9, 12–14 and 16–18) move from the position shown in FIG. 12 to the position shown in FIG. 16 to close the open hooks 134 about the legs of the stretched filament 12.

While the movable head 70 and stationary head 72 are restrained by the second stop 86b, the shaft 76 and the jaw-operated cams 84 affixed thereto continue their clockwise rotation from the position shown in FIG. 16 to the position shown in FIG. 17 with the result that the raised portions of the jaw-operating cams 84, which can be termed jaw-opening means, again rotate the rollers 132, and force the movable jaws 78 to their open position against the tension of spring 82, as shown in FIG. 17. In the meantime, as can be noted from FIG. 17, a second variable-length filament 12 has been delivered by the filament-feeding apparatus 10 to the filament-centralizing notch 22 in the filament-supporting block 24.

Thereafter the carriage 77 and hence the movable head 70 and stationary head 72 carried thereby are retracted to the left by the carriage-reciprocating mechanism a distance "$d_4$" (FIG. 18) to permit the lamp mount 136 to be indexed by the head 138 to the next work station on the filament-mounting machine. In the position shown in FIG. 18, the center of the shaft 76 coincides with the line "A—A."

The head-oscillating mechanism then rotates the movable head 70 and stationary head 72 in counterclockwise direction from the position shown in FIG. 18 to the starting position of such heads shown in FIG. 9 whereupon the filament-transfer operation is repeated as above-described.

From the foregoing it should be apparent that when the improved transfer apparatus of the present invention is employed with an orienting turret (not shown) of the type disclosed in the above-mentioned U.S. patent application, Serial No. 787,165, the filament-supporting head on such orienting turret does not require a jaw-positioning mechanism and hence such head will have a more simplified construction.

It will be recognized by those skilled in the art that the objects of the present invention have been achieved by the provision of an improved transfer device for transferring, and stretching during transfer, elongated articles such as filaments for incandescent lamps. Such improved transfer device permits the use of simplified and inexpensive control means thus reducing the number of moving parts, requiring less maintenance of the apparatus and resulting in more efficient operation thereof. It is also significant to note that the improved transfer device of the present invention may just as readily be employed in conjunction with a machine for mounting vertical filaments, in which case a more simplified filament-supporting head on the orienting turret may be also employed. A still further advantage of the improved transfer device, as herein shown and described, resides in the fact that when employed with a machine for mounting horizontal filaments a simplified stem-supporting head may be used in the filament-mounting machine. The utilization of a common drive means for both the filament-measuring head and the jaw-positioning mechanism additionally assures the simultaneous operation (and simultaneous cessation of operation) of such devices.

While in accordance with the patent statutes one preferred embodiment of the present invention has been illustrated and described in detail, it is to be particularly understood that the invention is not limited thereto or thereby.

I claim:

Apparatus for securing a coiled elongated article retained at an article pick-up station and transferring such article to an article discharge station, in addition to stretching such article during transfer to a predetermined length, said apparatus comprising:

(a) measuring means adjacent to said pick-up station for measuring the longitudinal dimension of said article at said pick-up station;

(b) article transfer means carrying two pairs of gripping jaws normally spaced a predetermined distance from one another, and one pair of said gripping jaws movable with respect to the other pair of said gripping jaws;

(c) jaw-positioning means responsive to said measuring means to move said movable pair of gripping jaws toward said other pair of gripping jaws through an amount corresponding to the longitudinal dimension of said article as measured by said measuring means, said jaw-positioning means comprising a rotatable bearing race and a stationary bearing race having bearings therebetween, said bearing races provided with bearing-containing grooves which vary in width so that rotation of said rotatable bearing race causes lateral movement between said rotatable bearing race and said stationary bearing race, and said measuring means operating to control the amount of rotation of said rotatable bearing race;

(d) jaw-closing means operable to cause said pairs of gripping jaws to grip said measured article as retained at said pick-up station;

(e) pivotal and lateral movement means operable to pivot and laterally move said jaws comprising said transfer means and said article gripped thereby from a position adjacent to said pick-up station to a position adjacent to said discharge station, said jaw-positioning means during pivotal and lateral movement of said gripped article causing said movable pair of gripping jaws to move away from said other pair of gripping jaws and to stretch said gripped article through a distance corresponding to the distance through which said movable pair of gripping jaws were previously moved toward said other pair of gripping jaws by said jaw-positioning means;

(f) jaw-opening means operable to open said pairs of gripping jaws at said discharge station to release said article after said article has been secured in its stretched condition; and (g) operating means for actuating said measuring means, said article transfer means and said gripping jaws, said jaw-positioning means, said jaw-closing means, said pivotal and lateral movement means, and said jaw-opening means in the foregoing work sequence.

References Cited in the file of this patent

UNITED STATES PATENTS

| | | |
|---|---|---|
| 1,830,222 | Brindle | Nov. 3, 1931 |
| 2,748,235 | Wallace | May 29, 1956 |
| 2,927,679 | Rively | Mar. 8, 1960 |
| 3,033,241 | Smith | May 8, 1962 |